United States Patent
Knoll et al.

(10) Patent No.: US 8,924,258 B2
(45) Date of Patent: Dec. 30, 2014

(54) MOBILE POINT-OF-SALE

(71) Applicant: Target Brands, Inc., Minneapolis, MN (US)

(72) Inventors: Mitchell Knoll, Eagan, MN (US); Robert D. Peota, Minneapolis, MN (US); David J. Floersch, Minneapolis, MN (US); Steve Nistler, Rosemount, MN (US); Peter J. Floersch, Lakeville, MN (US); Cory Benson, Savage, MN (US); Charles Jondal, Jordan, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/800,615

(22) Filed: Mar. 13, 2013

(65) Prior Publication Data

US 2014/0279119 A1    Sep. 18, 2014

(51) Int. Cl.
| | |
|---|---|
| *G06Q 20/00* | (2012.01) |
| *G06Q 40/00* | (2012.01) |
| *G07D 11/00* | (2006.01) |
| *G07F 19/00* | (2006.01) |
| *G06Q 20/20* | (2012.01) |
| *B62B 3/02* | (2006.01) |
| *G06Q 90/00* | (2006.01) |

(52) U.S. Cl.
CPC ............... *G06Q 20/208* (2013.01); *B62B 3/02* (2013.01); *G06Q 90/00* (2013.01)
USPC ............................................. 705/16; 235/379

(58) Field of Classification Search
USPC ....................................... 705/30, 16; 235/379
See application file for complete search history.

(56) References Cited

U.S. PATENT DOCUMENTS

| | | |
|---|---|---|
| D94,459 S | 2/1935 | Anderson |
| 2,456,817 A | 12/1948 | Davenport |
| 2,948,798 A | 8/1960 | Ness |
| D196,794 S | 11/1963 | Gacki |
| D219,913 S | 2/1971 | Malm et al. |
| 3,897,855 A | 8/1975 | Patterson |
| D323,051 S | 1/1992 | Baggott |
| 5,412,193 A | 5/1995 | Swartz et al. |

(Continued)

FOREIGN PATENT DOCUMENTS

| | | |
|---|---|---|
| GB | 2394211 A | 4/2001 |
| GB | 2358727 A | 8/2001 |

OTHER PUBLICATIONS

Office Action from Canadian Patent Application No. 2,820,476, mailed Jan. 14, 2014 (2 pages).

(Continued)

*Primary Examiner* — Seye Iwarere
(74) *Attorney, Agent, or Firm* — Merek, Blackmon & Voorhees, LLC

(57) ABSTRACT

A mobile point-of-sale system includes a cart frame and a battery housed in the cart frame. The cart frame includes a front having a bottom, a back having a bottom edge and a bottom. The bottom includes a pair of upper flanges and a lower housing. The pair of upper flanges have components for receiving wheels for supporting the cart frame and the lower housing includes at least one aperture for venting heat from the battery that is supported by the lower housing. At least a portion of the lower housing and the battery are located below the pair of upper flanges and are located below the bottom edges of the front and the back.

20 Claims, 12 Drawing Sheets

(56) References Cited

U.S. PATENT DOCUMENTS

| | | |
|---|---|---|
| 5,418,354 A | 5/1995 | Halling et al. |
| 5,584,362 A | 12/1996 | Dumont |
| 6,328,149 B1 | 12/2001 | Blad et al. |
| 6,435,407 B1 | 8/2002 | Fiordelisi |
| D468,881 S | 1/2003 | Cox |
| 6,655,589 B1 | 12/2003 | Humber |
| 6,758,393 B1 | 7/2004 | Luciano et al. |
| 7,044,374 B2 | 5/2006 | Allison et al. |
| 7,156,475 B2 | 1/2007 | Gloger, Jr. |
| D547,920 S | 7/2007 | Kinsley et al. |
| D592,417 S | 5/2009 | Cohn et al. |
| D653,010 S | 1/2012 | Shen et al. |
| D671,703 S | 11/2012 | Guasta et al. |
| 2003/0155731 A1 | 8/2003 | Ditges et al. |
| 2005/0212241 A1 | 9/2005 | Stone |

OTHER PUBLICATIONS

Images of Point-of-Sale Cart, publicly available at least as early as Nov. 2012, 2 pages.

Pending U.S. Appl. No. 29/448,707, filed Mar. 13, 2013, entitled Point-of-Sale Cart, 16 pages.

Office Action from Canadian Patent Application No. 2,820,476, mailed Oct. 4, 2013 (3 pages).

Office Action from Canadian Patent Application No. 2,820,476, mailed Aug. 20, 2014 (2 pages).

Office Action from Canadian Patent Application No. 2,820,476, mailed May 2, 2014 (2 pages).

MOBILE POINT-OF-SALE

BACKGROUND

Retail transactions are processed at a point-of-sale (POS) or checkout lane. In particular, a POS or checkout lane is where a customer makes a payment in exchange for retail goods or services. In retail stores where floor space is limited, mobile computing devices can be used to perform POS transactions. Mobile POS transactions streamline the customer's checkout experience.

The discussion above is merely provided for general background information and is not intended to be used as an aid in determining the scope of the claimed subject matter.

SUMMARY

A mobile point-of-sale system includes a cart frame and a battery housed in the cart frame. The cart frame includes a front, a back and a bottom. The front and the back have bottom edges. The bottom includes a pair of upper flanges and a lower housing. The pair of upper flanges have components for receiving wheels for supporting the cart frame and the lower housing includes at least one aperture for venting heat from the battery that is supported by the lower housing. At least a portion of the lower housing and the battery are located below the pair of upper flanges and are located below the bottom edges of the front and the back.

Coupled to the cart frame is a countertop and a support pole extending from a top surface of the countertop along an axis and terminating at a top end. A mobile computing device is mounted to the support pole and has a display screen. A printer is also mounted to the support pole and is in data communication with the mobile computing device. The battery is electrically coupled to and powers the mobile computing device and the printer through at least one conductor that runs inside the support pole. The mobile computing device and the printer swing in concurrence about the axis of the support pole to orient the display screen of the mobile computing device and a front of the printer at various positions about the axis of the support pole for user access.

To configure the mobile point-of-sale system, the mobile point-of-sale system is moved to a desired location. The mobile computing device and the printer are powered-on through the at least one conductor that is located within the hollow support pole. A position of the mobile computing device and the printer is selectively adjusted depending on a side of the cart frame where user access is needed. The mobile computing device and the printer swing in concurrence about the axis of the support pole.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Described below is a mobile point-of-sale (POS) system that includes a cart frame and a rechargeable power source located in a housing that is positioned below at least a portion of the front, the back and/or sides of the cart frame. For example, a mobile POS system can be moved to a desired location in a retail store or elsewhere and be used to perform transactions. The mobile POS system also includes a support pole that extends along an axis from a top surface of a countertop that is supported by the cart frame. A mobile computing device and a printer can be mounted to the support pole. The mobile computing device and the printer are rotatable in concurrence about the axis of the support pole to orient a display screen of the mobile computing device and a front of the printer at multiple positions about the axis of the support pole to provide user access where needed.

Figure 1:
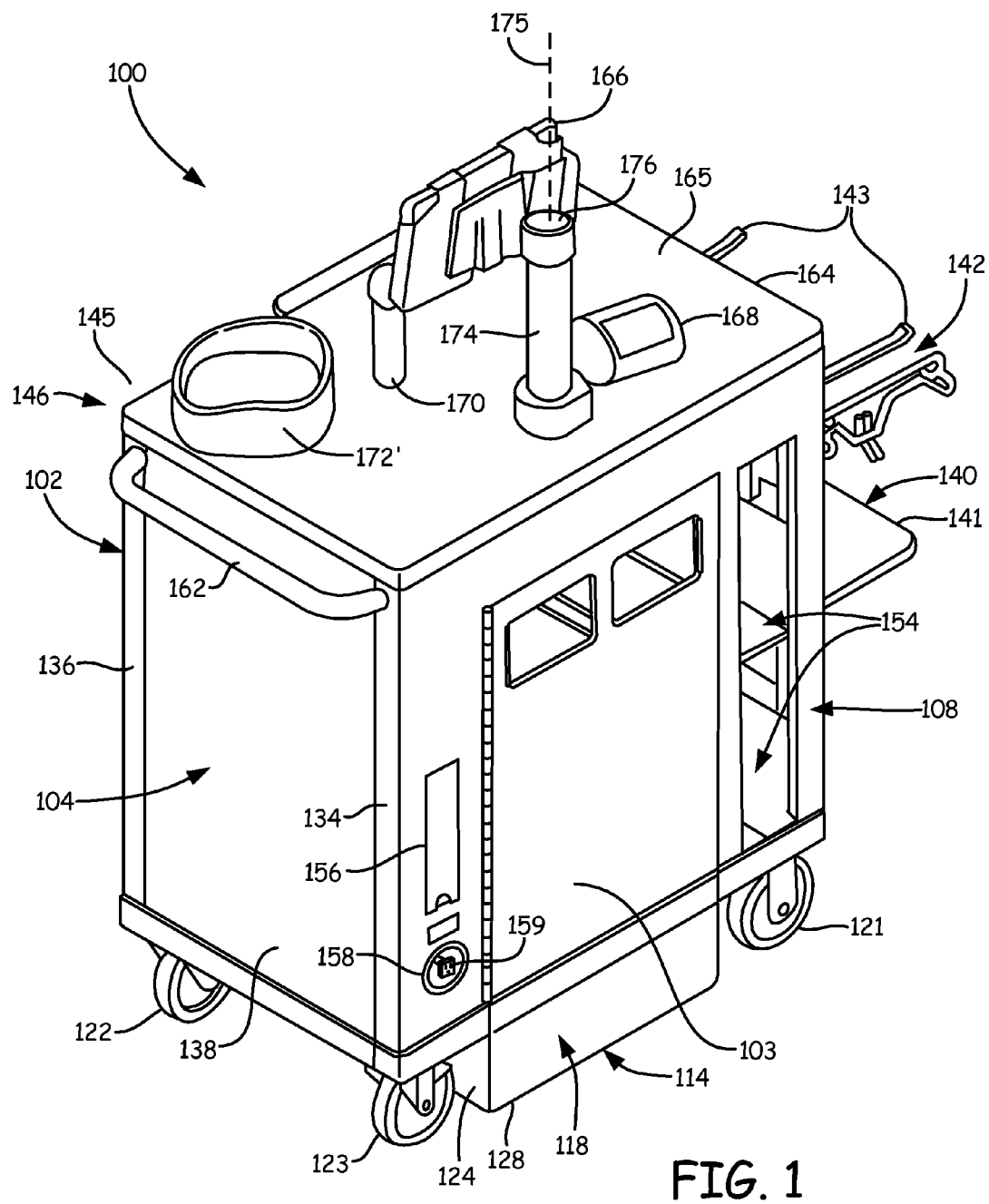
FIG. 1 is a front right perspective view of a mobile point-of-sale (POS) system according to one embodiment.
Figure 2:
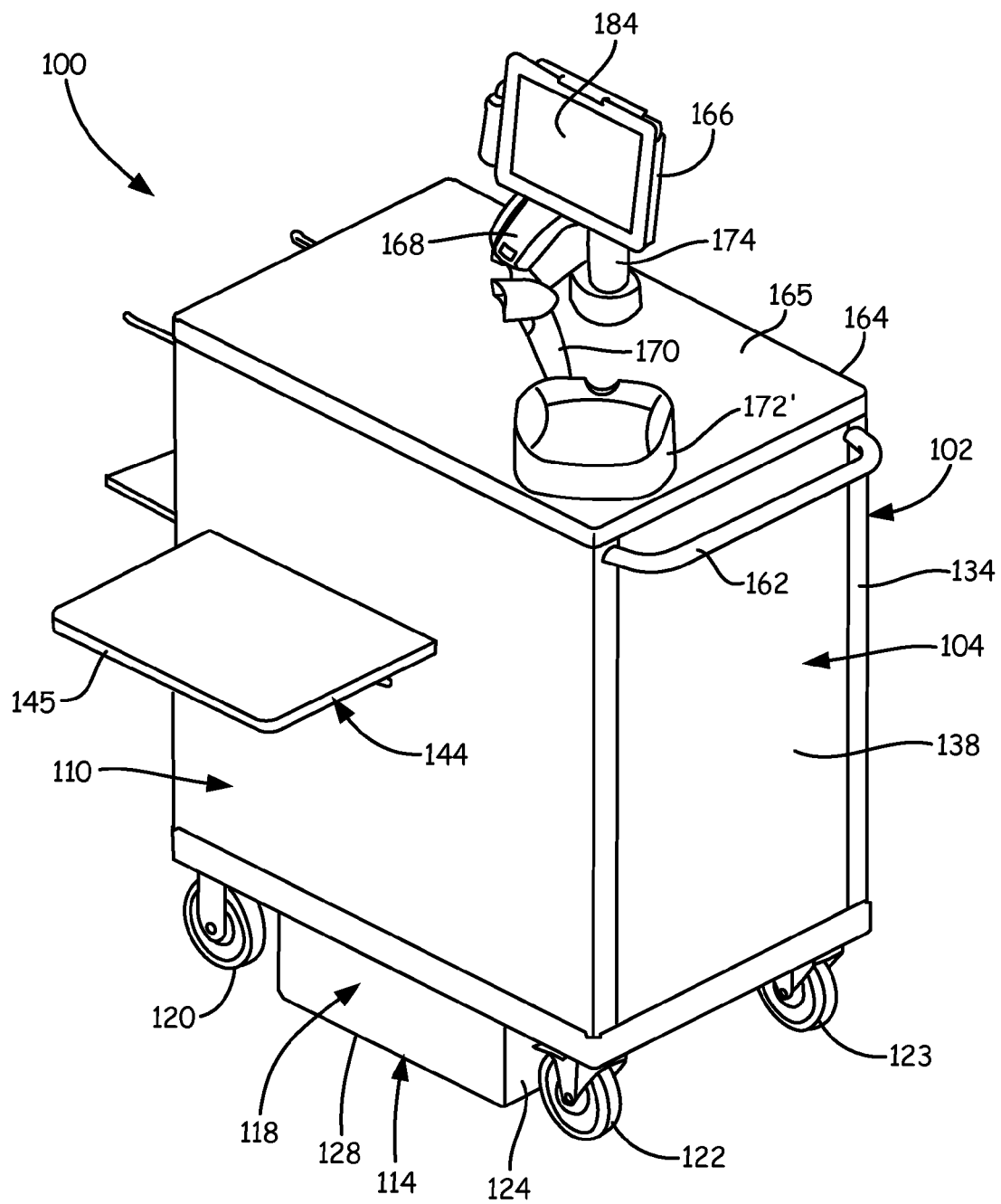
FIG. 2 is a front left perspective view of the mobile POS system illustrated in FIG. 1.
Figure 3:
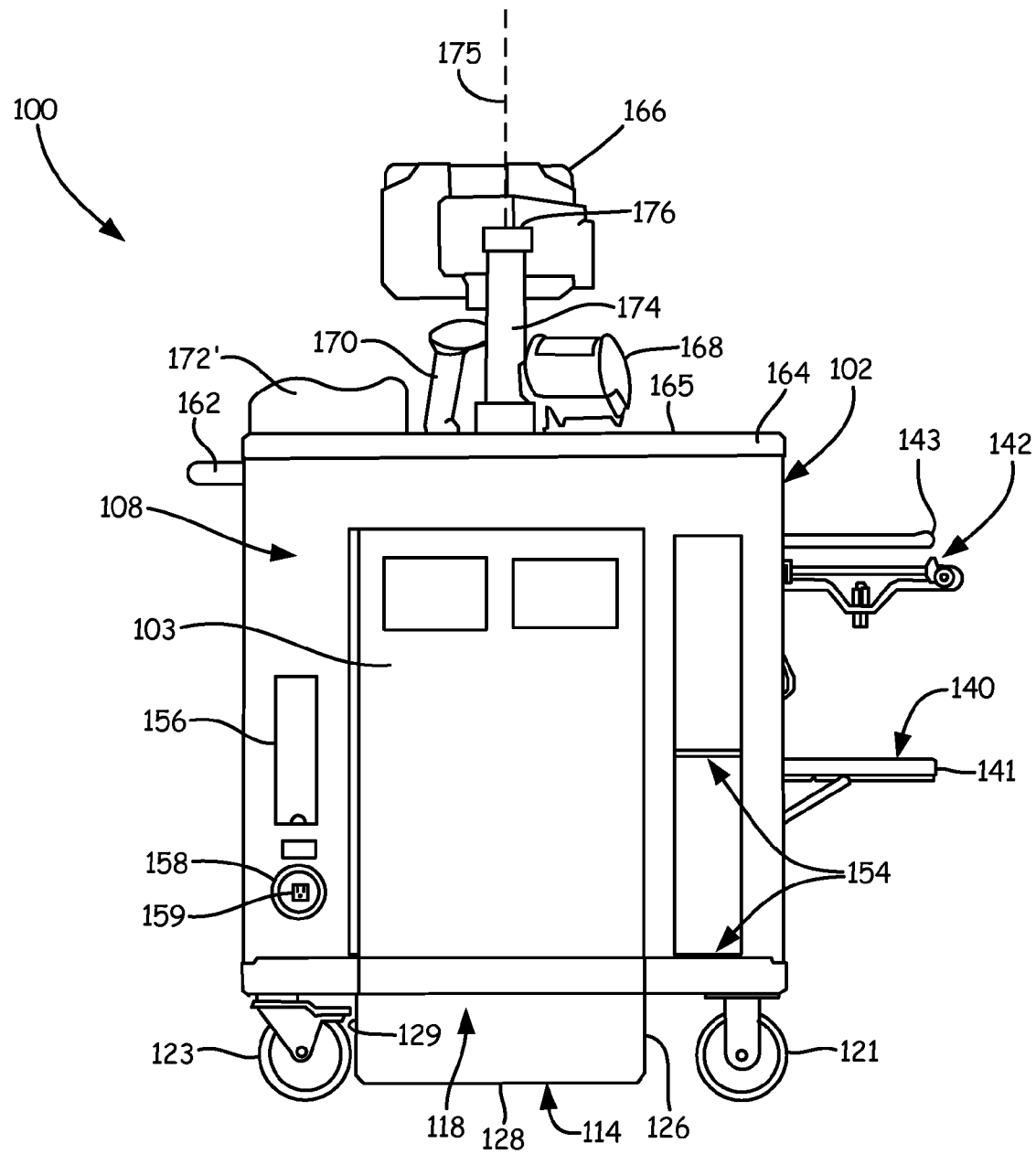
FIG. 3 is a right side view of the mobile POS system illustrated in FIG. 1.
Figure 4:
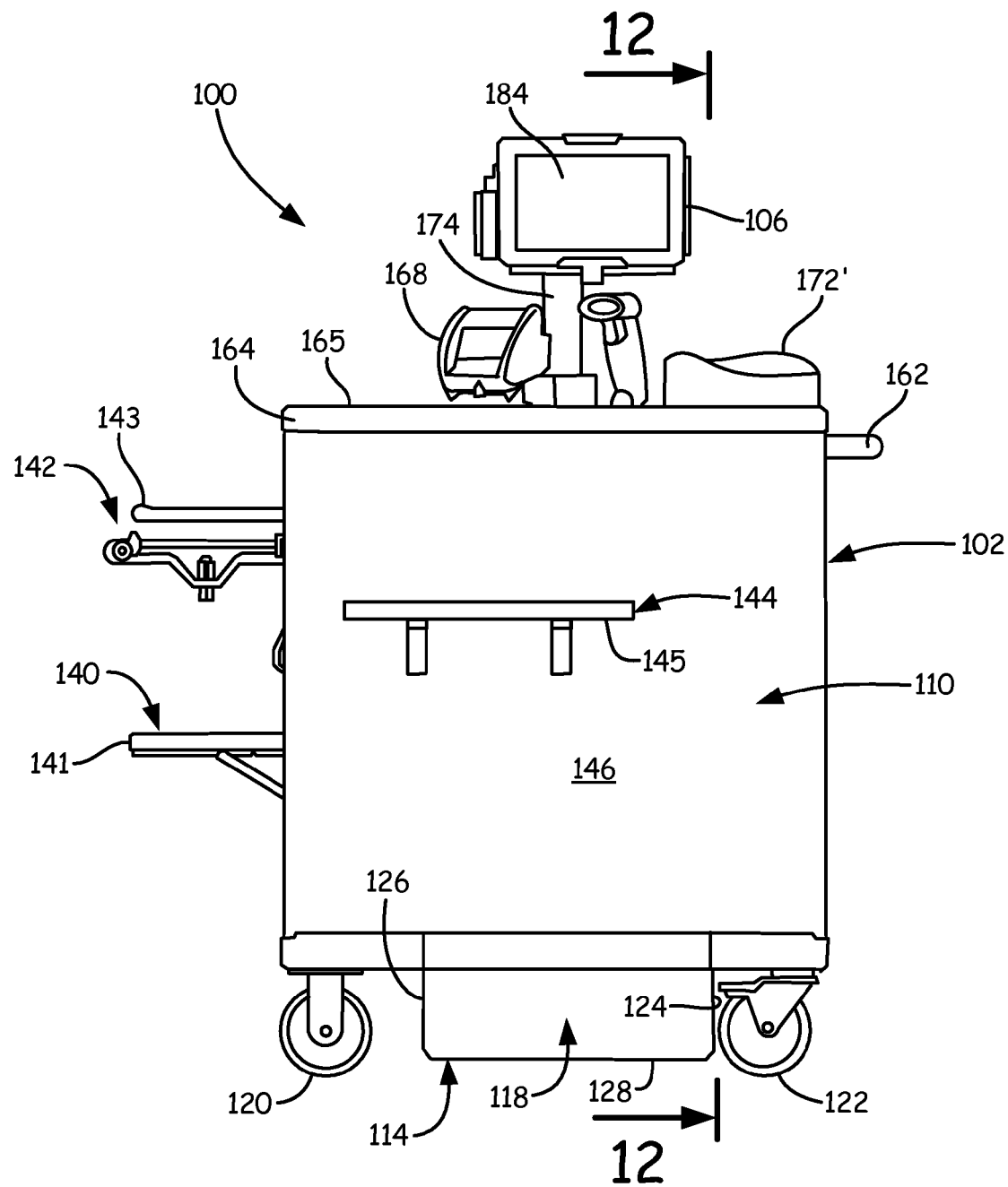
FIG. 4 is a left side view of the mobile POS system illustrated in FIG. 1.
Figure 8:
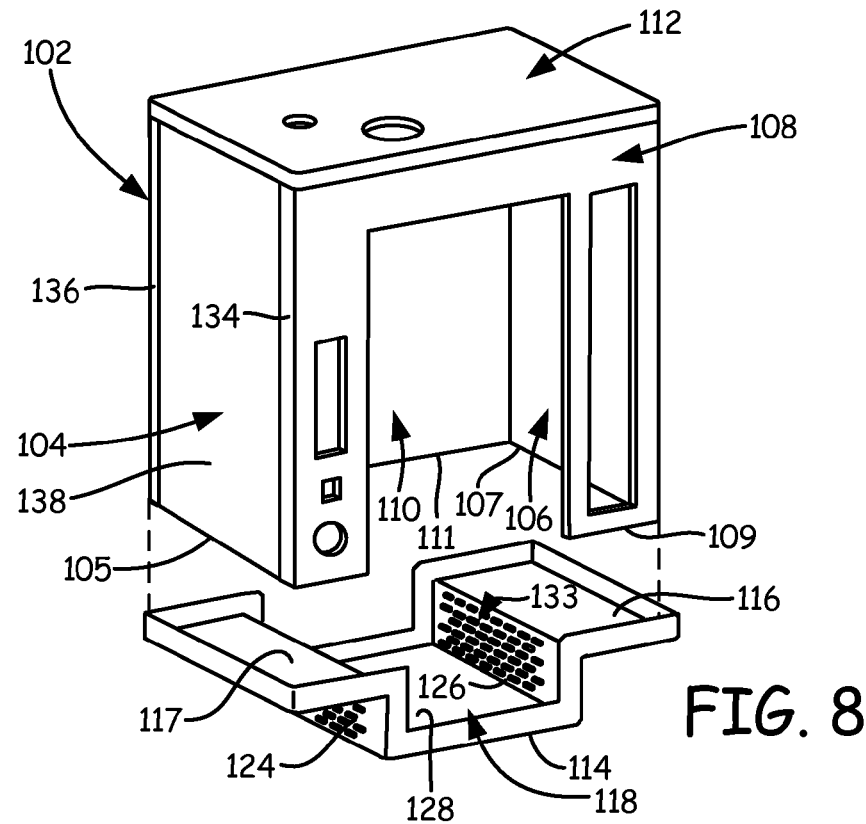
FIG. 8 is an exploded perspective view of a cart frame of the mobile POS system illustrated in FIG. 1.
Figure 9:
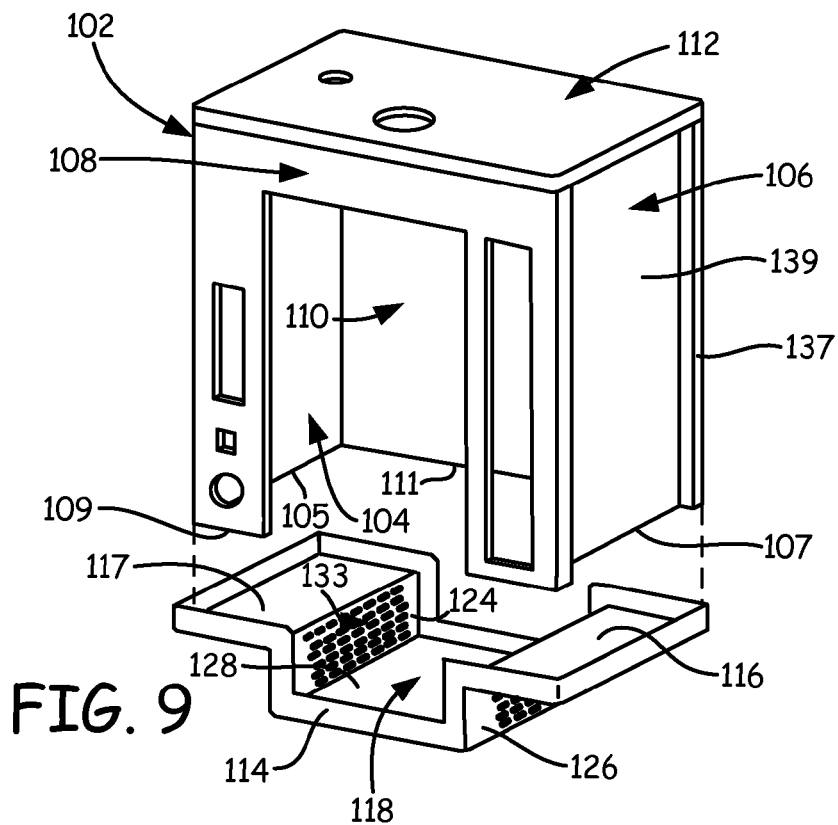
FIG. 9 is an exploded the bottom exploded.
Figure 10:
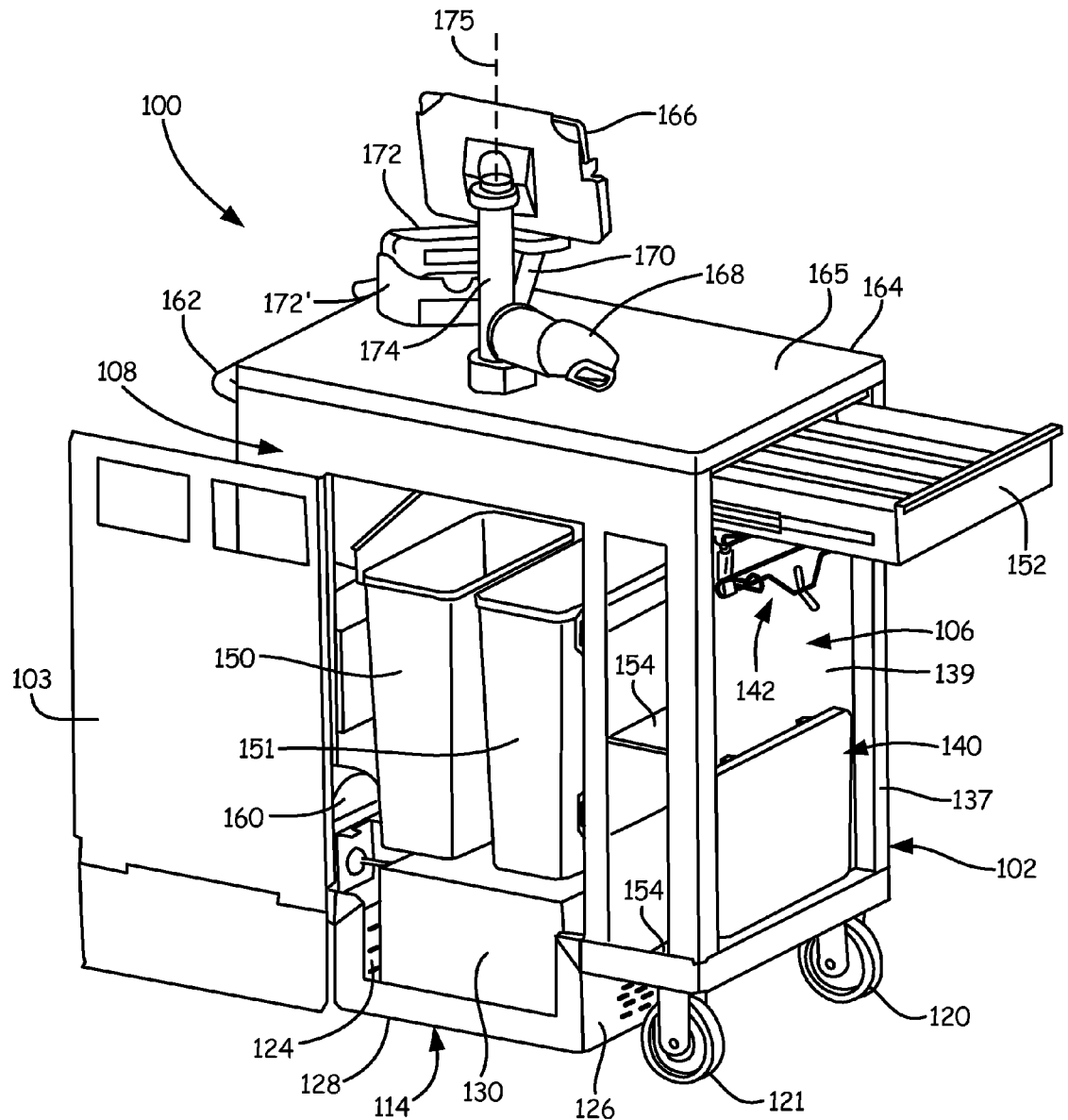
FIG. 10 is a back right perspective view of the mobile POS system illustrated in FIG. 1 in an alternate position.
Figure 11:
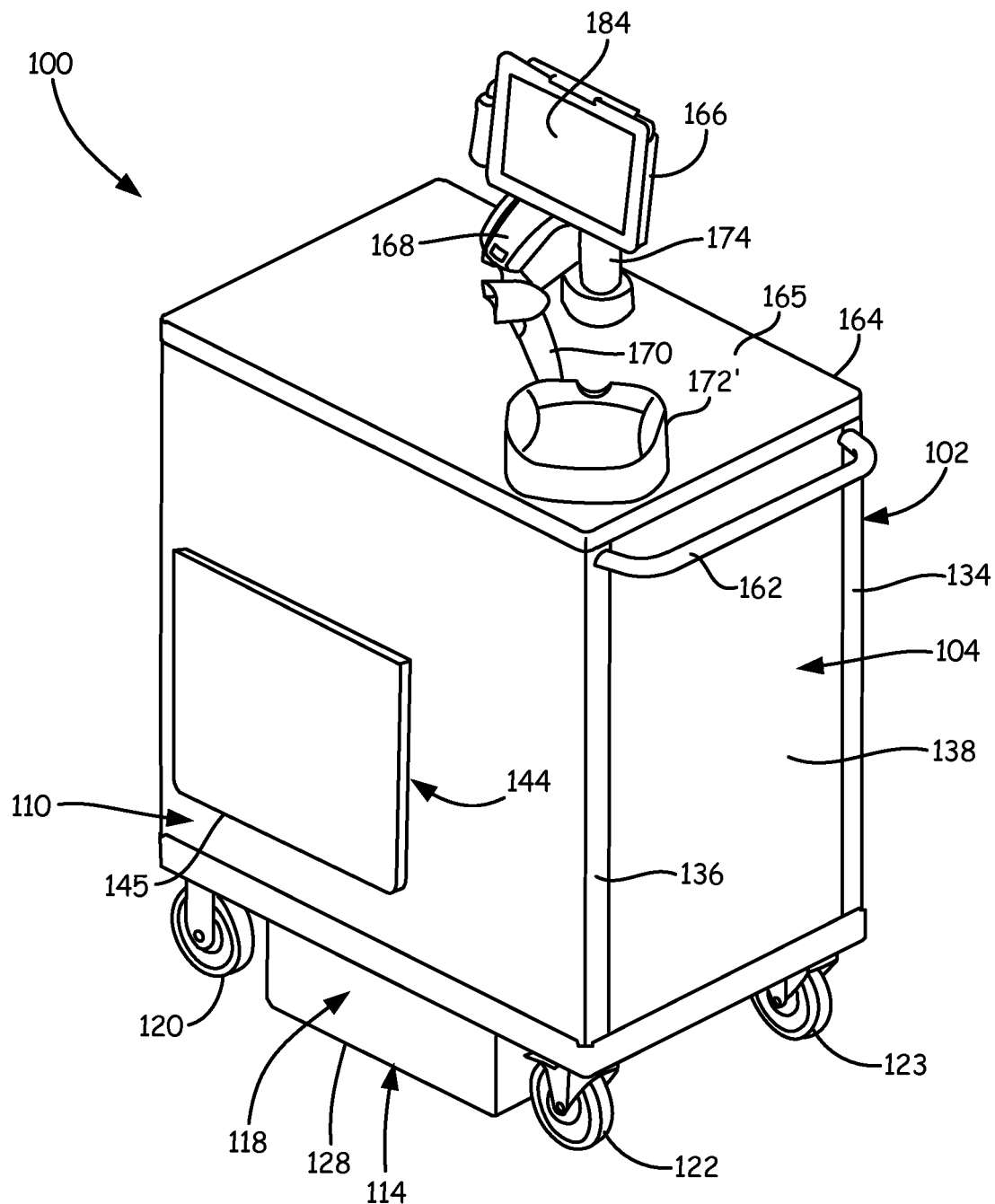
FIG. 11 is a front left perspective view of FIG. 10, but with the drawer shut.

FIGS. 1 and 2 are perspective views of a mobile POS system 100. The right side, the left side, the back, the front and the top are illustrated in FIGS. 3-7. FIGS. 8 and 9 illustrate exploded perspective views of a cart frame or mobile checklane structure 102 of mobile POS system 100. FIGS. 10 and 11 illustrate perspective views of mobile POS system 100 with door 103 in an opened position and select components opened or collapsed. Cart frame 102 is made of a material that provides sufficient strength for supporting the components of mobile POS system 100, such as metal, and includes a front panel 104, a back panel 106, a right side panel 108, a left side panel 110, a top panel 112 (FIGS. 8 and 9) and a bottom 114. As shown in FIGS. 8 and 9, front panel 104 includes bottom edge 105, back panel 106 includes bottom edge 107, right side panel 108 includes bottom edge 109 and left side panel 110 includes bottom edge 111. Bottom 114 of cart frame 102 includes a pair of upper flanges or upper decks 116 and 117 and a lower housing 118.

Although not specifically illustrated in FIGS. 8 and 9, upper flanges or upper decks 116 and 117 can include components for receiving wheels or casters 120, 121, 122 and 123. In some embodiments, upper flanges 116 and 117 can include through holes for receiving hardware for coupling wheels or casters 120, 121, 122 and 123. In other embodiments, bottoms of upper flanges 116 and 117 can include posts for receiving wheels or casters 120, 121, 122 and 123. Regardless and as illustrated in FIGS. 1-6, upper flange 116 is coupled to wheels or casters 120 and 121 and upper flange 117 is coupled to wheels or casters 122 and 123.

Lower housing 118 includes at least a front side 124, a back side 126 and a floor 128 for supporting and housing a power source module 130 (FIG. 10). Power source module 130 houses at least a battery, a battery charger and a power inverter. Power source 130 provides the requisite power to all components located within or supported by cart frame 102 of mobile POS system 100. Front side 124 is oriented substantially parallel with front panel 104 of cart frame 102, back side 126 is oriented substantially parallel with back panel 106 of cart frame 102 and floor 128 is oriented substantially normal to front panel 104 and back panel 106. As illustrated in FIGS. 1-6, at least a portion of each of front side 124, back side 126 and floor 128 of lower housing 118 are located below upper flanges 116 and 117 of bottom 114 as well as located below bottom edges 105, 107, 109 and 111 of front panel 104, back panel 106, right side panel 108 and left side panel 110 of cart frame 102. Therefore, at least a portion of power source 130 is located below upper flanges 116 and 117 of bottom 114 and below bottom edges 105, 107, 109 and 111 of front panel 104, back panel 106, right side panel 108 and left side panel 110 of cart frame 102. Power source module 130, including the battery, battery charger and the power inverter, contributes a significant amount of weight to the total weight of mobile POS system 100. By housing power source 130 below upper flanges 116 and 117 of bottom 114 and below bottom edges 105, 107, 109 and 111 of front panel 104, back panel 106, right side panel 108 and left side panel 110 of cart frame 102, mobile POS system 100 is well-balanced so that cart frame 102 does not tip over due to loads applied to or supported by the top of the cart frame.

In addition, lower housing 118 includes at least one aperture. In one embodiment, each of front side 124 and back side 126 include a plurality of apertures. In this embodiment and as illustrated in FIGS. 5, 6, 8, 9 and 10, a plurality of apertures 132 are located on front side 124 of lower housing 118 and a plurality of apertures 133 are located on back side 126 of lower housing 118. By placing apertures 132 and 133 on opposing sides of lower housing 118, air flow can enter and exit lower housing 118 and thereby provide power source module 130 with cross ventilation for dissipating heat being created by the battery.

As illustrated in FIGS. 1, 2 and 8, right side panel 108 includes a front edge 134 and left side panel 110 includes a front edge 136. Front edges 134 and 136 of right side panel 108 and left side panel 110 are in alignment with an exterior surface 138 of front panel 104. As illustrated in FIGS. 9 and 10, right side panel 108 includes a back edge 135 and left side panel 110 includes a back edge 137. Back edges 135 and 137 of right side panel 108 and left side panel 110 are not in alignment with an exterior surface 139 of back panel 106. In particular, exterior surface 139 of back panel 106 is recessed from back edges 135 and 137 of right side panel 108 and left side panel 110. The recess created by back edge 135, back edge 137 and exterior surface 139 provides a space for storing a collapsed bag shelf and a collapsed bag rack as illustrated in FIG. 10.

Mobile POS system 100 includes a collapsible bag shelf 140 and a collapsible bag rack 142 coupled to exterior surface 139 of back panel 106. Bag shelf 140 includes a free end 141 and bag rack 142 includes a free end 143. As illustrated in FIGS. 1-5 and 7, bag shelf 140 and bag rack 142 are placed in an erected state. In erected states, free end 141 of bag shelf 140 protrudes from back edges 135 and 137 of right side panel 108 and left side panel 110 and free end 143 of bag rack 142 protrudes from back edges 135 and 137 of right side panel 108 and left side panel 110. Bag shelf 140, when erected, is capable of providing a support surface for holding a bag to be loaded with items and bag rack 142, when erected, is capable of supporting a bag from its handles to be loaded with items. As illustrated in FIG. 10, bag shelf 140 and bag rack 142 are placed into a collapsed state. In a collapsed state, free end 141 of bag shelf 140 is recessed from back edges 135 and 137 of right side panel 108 and left side panel 110 such that the bottom of bag shelf 140 is positioned flush against exterior surface 139 of back panel 106. In a collapsed state, free end 143 of bag rack 142 is recessed from back edges 135 and 137 of right side panel 108 and left side panel 110 such that the bottom of bag rack 142 is positioned flush against exterior surface 139 of back panel 106.

Mobile POS system 100 also includes a collapsible shopping basket shelf 144 coupled to exterior surface 146 of left side panel 110. Shopping basket shelf 144 includes a free end 145. As illustrated in FIGS. 1-2, 4 and 5-7, shopping basket shelf 144 is placed in an erected state. In the erected state, free end 145 of shopping basket shelf 144 extends outwardly from exterior surface 146 of left side panel 110. Shopping basket shelf 144, when erected, is capable of providing a support surface for holding a shopping basket that is to be emptied or unloaded of items. As illustrated in FIG. 11, shopping basket shelf 144 is placed into a collapsed state. In the collapsed state, the bottom of shopping basket shelf 144 is positioned flush against exterior surface 146 of left side panel 110.

To access the interior of cart frame 102, mobile POS system 100 includes a door 103. Door 103 is illustrated in a closed position in FIGS. 1 and 3 and illustrated in an opened position in FIG. 10. Although not specifically illustrated, door 103 is held in a closed position with a magnetic latch and when door 103 is opened, power source 130 can be accessed as well as bins 150 and 151. Bin 150 provides a compartment for holding trash and bin 151 provides a compartment for holding empty hangers. Mobile POS system 100 also includes a drawer 152 accessible from the back of mobile POS system 100. Drawer 152 is illustrated as closed in FIG. 5 and illustrated as open in FIG. 10. According to one embodiment, mobile POS system 100 is designed to be a credit card, debit card, gift card or the like transaction system only and not a system capable of performing cash transactions. Therefore, drawer 152 is for use in holding various items including used coupons.

Figure 12:
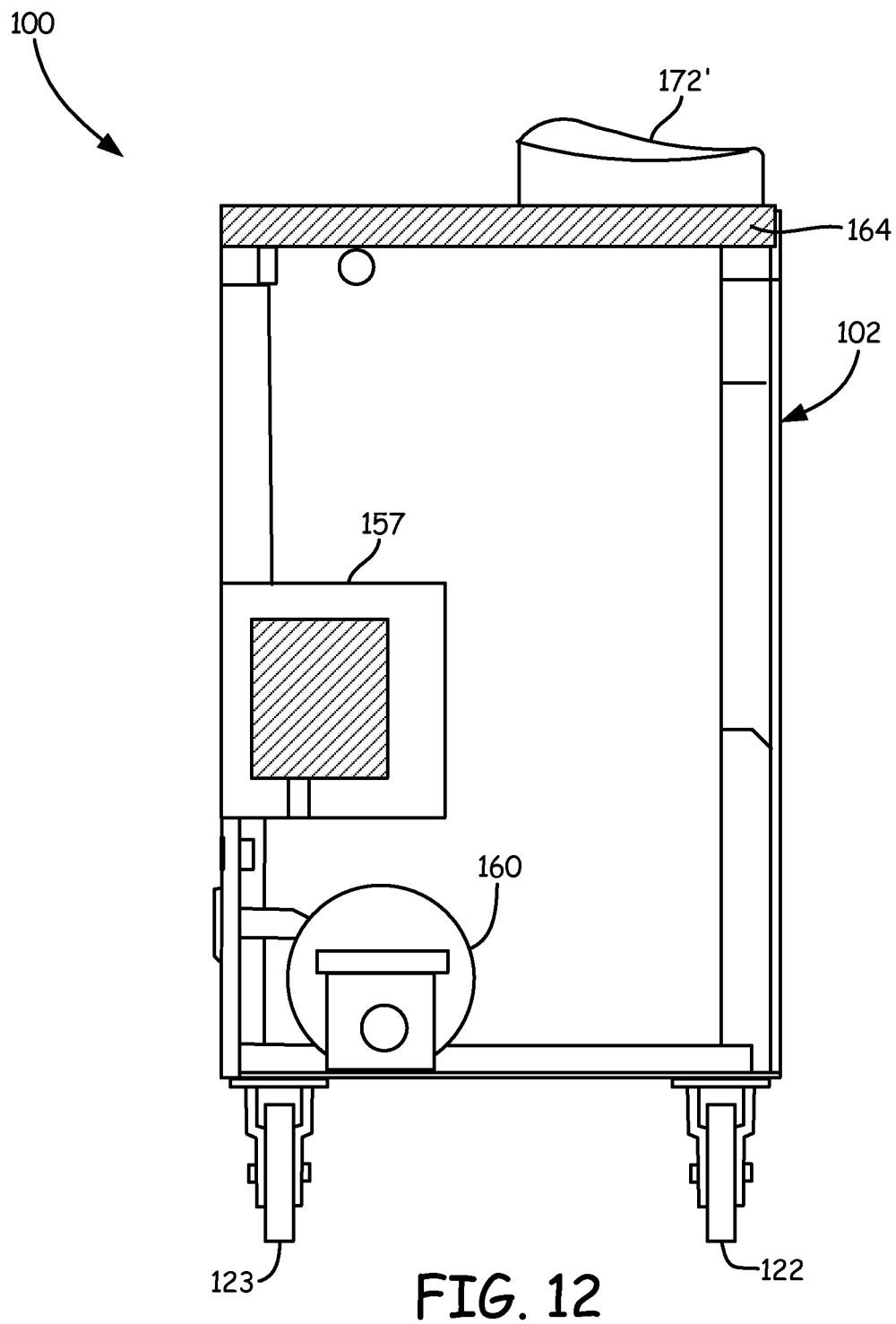
FIG. 12 is a section view of the mobile POS system of FIG. 1 taken through the line indicated in FIG. 4.

Other important features of mobile POS system 100 include shelves 154, which are accessible from the right side of mobile POS system 100 for holding paper bags or reusable bags, an Ethernet door 156 located on the right side of mobile POS system 100 that allows access to a hub of communication connections 157, an opening 158 located below Ethernet door 156 that provides access to an electrical cord 159 located on a retractable reel 160 (FIGS. 10 and 12) inside cart frame 102 and a push handle 162. The Ethernet communications hub 157 (FIG. 12) located behind Ethernet door 156 allows the electronic devices located on top of cart frame 102 to communicate with each other as well as to communicate over a wireless local area network, such as a LAN communications network. Electrical cord 159 can be pulled out from retractable reel 160 to plug into an electrical outlet. Generally, this type of connection occurs outside regular store hours and is for the purpose of charging power source 130 when mobile POS system 100 is not in use. A handle 162 is located on the front of mobile POS system 100 and provides a component for a user to push or move mobile POS system 100 to a desired location in a retail store or elsewhere.

Coupled to top panel 112 of cart frame 102 is a countertop 164 that supports a plurality of electronic devices. A support pole 174 is coupled to cart frame 102 and countertop 164 and extends from a top surface 165 of countertop 164 along an axis 175. Support pole 174 terminates at a top end 176. The total height of mobile POS system 100 from the bottom of casters 120-123 to top surface 165 is about equal to the average waist height of users of mobile POS system 100, such as the average waist height of a customer and/or cashier. More particularly, the height is about 35 to 38 inches. The total depth of mobile POS system 100 from front edges 134 and 136 of right and left side panels 108 and 110 to back edges 135 and 137 of right and left side panels 108 and 110 is about 30 to 31 inches. The total width of mobile POS system 100 from the exterior surface of right side panel 108 to the exterior surface of left side panel is about 18 to 29 inches.

Figure 13:
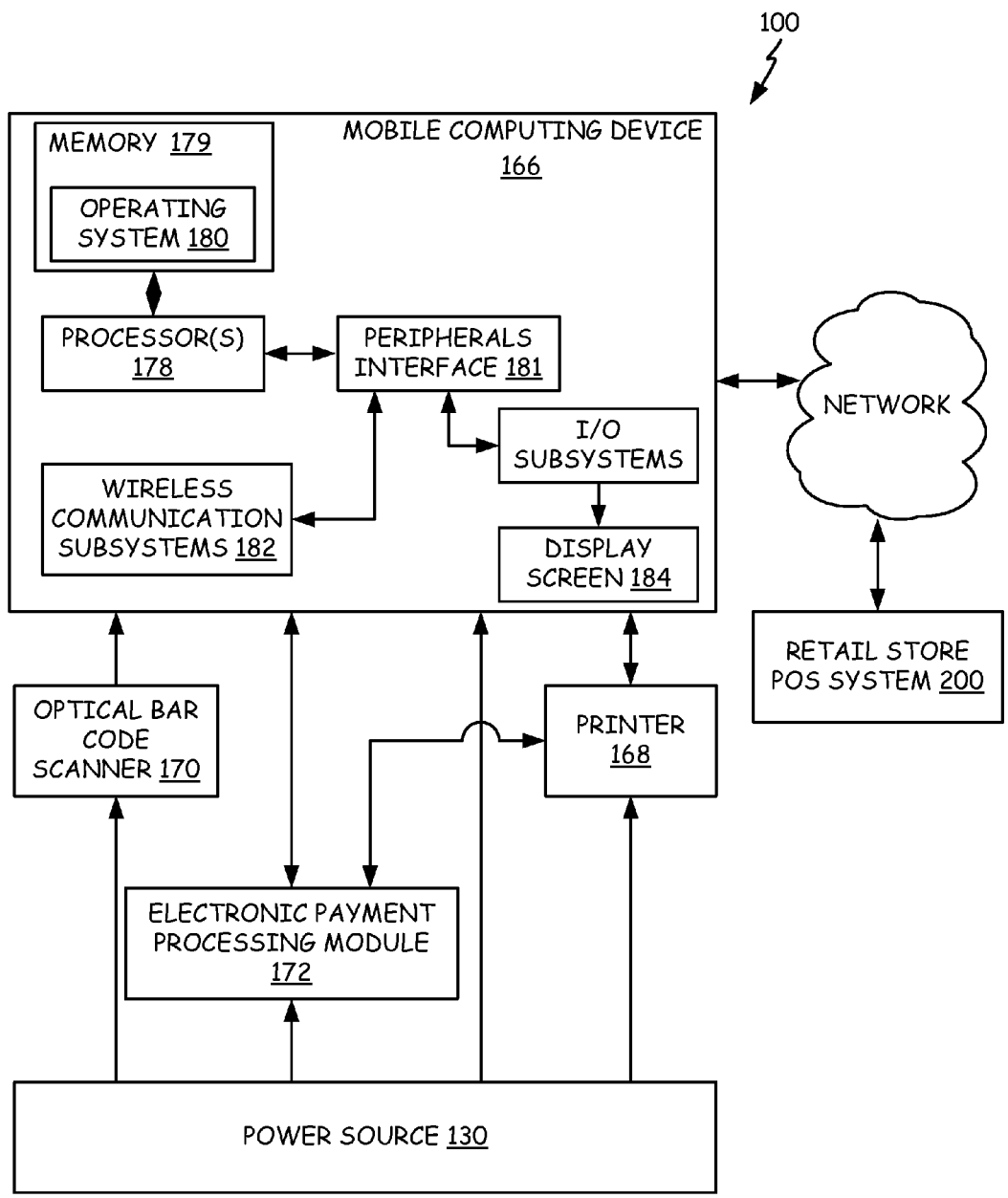
FIG. 13 is a block diagram of an exemplary mobile computing device and other electrical devices supported by and for use in the mobile POS system illustrated in FIG. 1.

In one embodiment, the plurality of electronic devices of mobile POS system 100 that are supported by countertop 164 coordinate to perform retail transactions. The plurality of electronic devices include a mobile computing device 166, a printer 168, a handheld optical bar code scanner 170 and an electronic payment processing module 172, of which a tray 172' for holding the electronic payment processing module 172 is illustrated in FIGS. 1-7 and 11-12 and FIG. 10 illustrates both the electronic payment processing module 172 and tray 172'. FIG. 13 illustrates a block diagram of these devices including how the devices interconnect and communicate with each other.

Mobile computing device 166 includes one or more processors 178, such as a central processing unit or image processors, and a memory 179. Processor(s) 178 and memory 179 are connected by one or more signal lines or buses. Memory 179 includes an operating system 180 that includes instructions for handling basic system services and performing hardware-dependent tasks. Memory 179 also includes, although not specifically illustrated, various instructions representing applications that can be executed by processor(s) 178 including communication applications and point-of-sale retail transaction applications. Communication applications allow processor(s) 178 to communicate with peripherals interface 181 and wireless communication subsystems 182 to a network and other devices, such as to a display screen 184 located on mobile computing device 166, to optical bar code scanner 170, to electronic payment processing module 172, to printer 168 and to a retail store's main POS system 200. In one embodiment, display screen 184 is a touch screen that is an electronic visual display that can be controlled by a user through multi-touch gestures. In addition and as discussed above, mobile POS system 100 includes a power source 130. Power source 130 includes a battery located in cart frame 102 and is configured to power devices 166, 168, 170 and 172.

Therefore, optical bar code scanner 170 is electrically coupled to power source 130 and in data communication with mobile computing device 166. For example, scanner 170 can be connected to power source 130 with a power cord or a scanner stand (not shown) can be connected to power source 130 with a power cord. In this example, the power cord runs through an opening in countertop 164. Regardless, optical bar code scanner 170 scans bar codes on products for entering in product information into mobile computing device 166 for processing. Electronic payment processing module 172 is electrically coupled to power source 130 and in data communication with mobile computing device 166. For example, tray 172' can be connected to power source 130 with a power cord. In this example, the power cord runs through the opening in countertop 164 that the power cord for scanner 170 runs through. Regardless, electronic payment processing module 172 allows payment for goods being processed by mobile computing device 166 to be made via credit card, debit card, gift card or the like. Printer 168 is electrically coupled to power source 130 and in data communication with mobile computing device 166. Printer 168 prints documents, such as coupons and receipts, documenting the POS transactions processed by mobile computing device 166.

With reference back to FIGS. 1-11, mobile computing device 166 is mounted to a first portion of support pole 174. As illustrated and in one embodiment, the first portion of support pole 174 is located adjacent to top end 176 of support pole 174. Printer 168 is mounted to a second portion of support pole 174. As illustrated and in one embodiment, the second portion of support pole 174 is different from the first portion of support pole 174 and is located adjacent to where support pole is coupled to countertop 164. Mobile computing device 166 and printer 168 swing together in concurrence about axis 175 of support pole 174 to orient display screen 184 on mobile computing device 166 and a front of printer 168 at various positions about axis 175 for user access. For example, if a user stands behind back panel 106 of cart frame 102, display screen 184 and the front of printer 168 should be oriented to face the back of mobile POS system 100. While the most convenient place for a user to stand is behind back panel 106 of cart frame to both process the retail transaction as well as load a bag with the retail product, it should be realized that the user can stand on any side of cart frame 102 and can swing both mobile computing device 166 and printer 168 at the same time about axis 175 of support pole 174 for access by pushing only one of the mobile computing device 166 or the printer 168. In addition, no matter where the user is standing, at any point during the transaction, the user can swing both mobile computing device 166 and printer 168 at the same time about axis 175 to orient display screen 184 toward a customer who is purchasing products.

In one embodiment, support pole 174 is rotatable about axis 175. For example, support pole 174 can be rotatably coupled to countertop 164 or top panel 112 of cart frame 102 by a grommet that allows for rotation of support pole 174. In this embodiment and as illustrated in FIGS. 1-11, mobile computing device 166 is attached to the first portion support pole 174 by a fixed bracket and printer 168 is attached to the second portion of support pole 174 by a fixed bracket so that when the support pole 174 is rotated about axis 175, mobile computing device 166 and printer 168 also rotate together about axis 175. In another embodiment, mobile computing device 166 and printer 168 can be attached to a non-rotating support pole 174 at two different portions of the support pole 174, but by a single bracket that is moveable about a fixed support pole 174. In this embodiment, mobile computing device 166 and printer 168 rotate in concurrence about axis 175 as well as about a fixed support pole 174.

Figure 5:
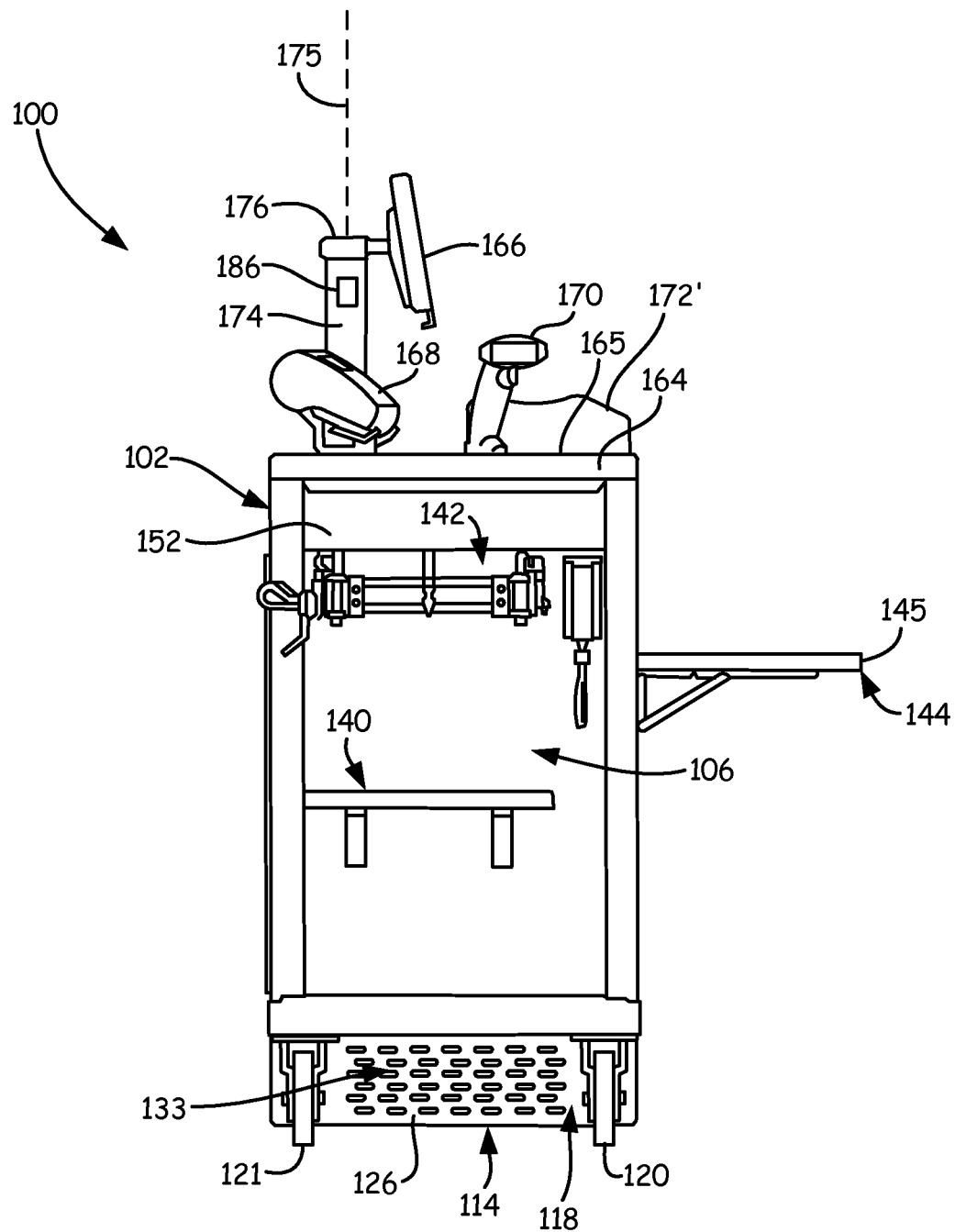
FIG. 5 is a back view of the mobile POS system illustrated in FIG. 1.
Figure 6:
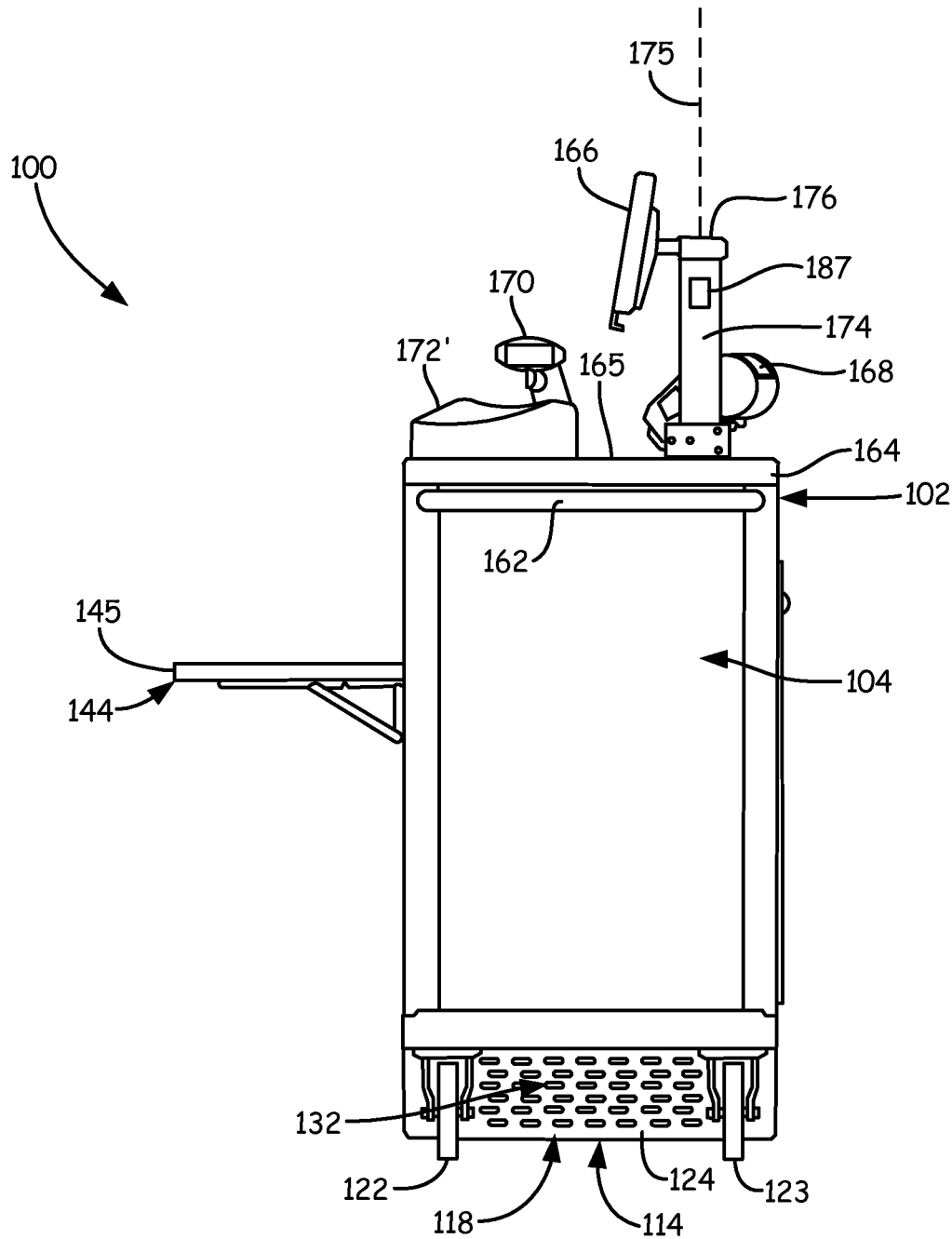
FIG. 6 is a front view of the mobile POS system illustrated in FIG. 1.
Figure 7:
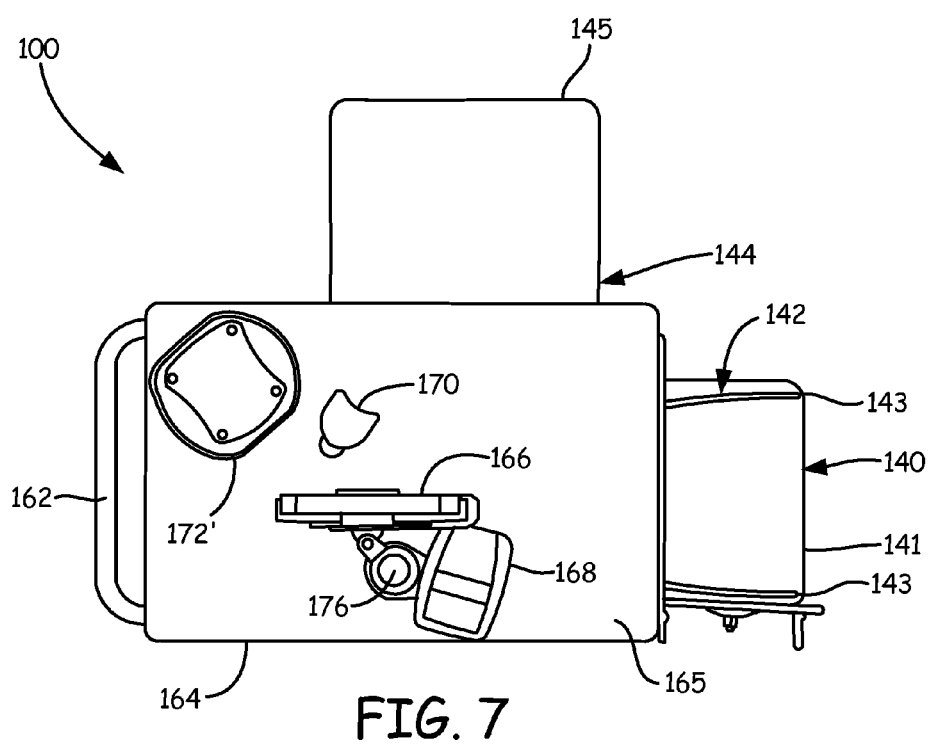
FIG. 7 is top view of the mobile POS system illustrated in FIG. 1.

In one embodiment and as illustrated in FIGS. 1-11, support pole 174 is hollow and includes at least one opening. For example, support pole 174 as illustrated in FIGS. 5 and 6 include openings 186 and 187. While openings 186 and 187 are illustrated as being located near where mobile computing device 166 is mounted to support pole 174, it should be understood that an at least one opening can be placed anywhere along a height of support pole 174. In this embodiment, the hollow interior or inside of support pole 174 houses a run of conductor(s) that electrically couple power source 130 to mobile computing device 166 and printer 168.

To configure mobile POS system 100 for use in a retail store or other space, mobile POS system 100, which is supported on casters 120-123, is pushed, wheeled or otherwise moved to a desired location. Although mobile POS system 100 can be moved to the desired location from any side of cart frame 102 because it includes casters 120-123 that are rotatable, handle 162 is provided on front panel 104 for ease of use. At the desired location, mobile computing device 166 having a display screen 184 is powered-on and printer 168 that is in data communication with the mobile computing device is also powered-on. Power source 130 supplies power to mobile computing device 166 and to printer 168. As previously discussed and in one embodiment, mobile computing device 166 and printer 168 are both mounted to different portions of support pole 174 and are coupled to and powered by power source 130 through conductors that are located within the hollow interior of support pole 174. A position of mobile computing device 166 and printer 168 are selectively adjusted depending on a side of cart frame 102 where user access is needed. As described above and in one embodiment, mobile computing device 166 and printer 168 swing in concurrence about axis 175 of support pole 174.

Prior to configuring the mobile POS system 100 as described in the previous paragraph, in one embodiment mobile POS system 100 is unplugged from an outlet before moving cart frame 102 to the desired location. By unplugging mobile POS system 100, power source 130 is changed from a charging state to a neutral state. When mobile computing device 166 and printer 168 are powered-on as described in the previous paragraph, power source 130 changes from a neutral state to a discharging state.

To further configure mobile POS system 100, bag shelf 140, which is attached to an exterior of the frame of the mobile checklane structure 102, is lifted from a collapsed state to an erected state. In the erected state, bag shelf is secured into a bag receiving position for loading a bag with product. To still further configure mobile POS system 100, shopping basket shelf 145 attached to an exterior of the mobile checklane structure 102 is lifted from a collapsed state to an erected state. In the erected state, shopping basket shelf 145 is secured into a shopping basket holding position for unloading the shopping basket of product.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A mobile point-of-sale system comprising:
a cart frame and a battery housed in the cart frame, the cart frame comprising:
 a front having a bottom edge;
 a back having a bottom edge; and
 a bottom including components for receiving wheels for supporting the cart frame and a lower housing for housing the battery, the lower housing having at least one aperture for venting heat from the battery; and
wherein at least a portion of the lower housing and the battery are located below the bottom edges of the front and the back.

2. The mobile point-of-sale system of claim 1, wherein the lower housing comprises a floor, a front side that is oriented substantially parallel with the front of the cart frame and a back side that is oriented substantially parallel with the back of the cart frame, wherein the at least one aperture comprises a plurality of apertures located in the front side of the lower housing and a plurality of apertures located in the back side of the lower housing.

3. The mobile point-of-sale system of claim 1, wherein the cart frame further comprises:
a right side panel having a front edge and a back edge;
a left side panel having a front edge and a back edge; and
wherein the front edges of the right side panel and the left side panel are in alignment with an exterior surface of the front and wherein an exterior surface of the back is recessed from the back edges of the right side panel and the left side panel.

4. The mobile point-of-sale system of claim 3, further comprising a bag shelf coupled to the exterior surface of the back of the cart frame and configurable into a collapsed state and an erected state, wherein when the bag shelf is in the erected state a free end of the bag shelf protrudes from the back edges of the right side panel and the left side panel and wherein when the bag shelf is in the collapsed state the bag shelf is recessed from the back edges of the right side panel and the left side panel.

5. The mobile point-of-sale system of claim 3, further comprising a bag rack coupled to the exterior surface of the back of the cart frame and configurable into a collapsed state and an erected state, wherein when the bag rack is in the erected state a free end of the bag rack protrudes from the back edges of the right side panel and the left side panel and wherein when the bag rack is in the collapsed state the bag rack is recessed from the back edges of the right side panel and the left side panel.

6. The mobile point-of-sale system of claim 3, further comprising a shopping basket shelf coupled to an exterior surface of the left side panel of the cart frame and configurable into a collapsed state and an erected state, the shopping basket shelf including a free end.

7. The mobile point-of-sale system of claim 1, further comprising:
a countertop coupled to a top of the cart frame; and
a support pole coupled to the countertop and extending from a top surface of the countertop along an axis;
a mobile computing device mounted to a first portion of the support pole and having a display screen; and
a printer mounted to a second portion of the support pole and being in data communication with the mobile computing device; and
wherein the mobile computing device and the printer swing together in concurrence about the axis of the support pole to orient the display screen of the mobile computing device and a front of the printer at various positions about the axis of the support pole for user access.

8. A mobile point-of-sale system comprising:
a mobile checklane structure including a cart frame and a power source contained within the mobile checklane structure, the power source including a battery housed in the cart frame, the cart frame comprising:
 a front having a bottom edge;
 a back having a bottom edge; and
 a bottom including components for receiving wheels for supporting the cart frame and a lower housing for housing the power source, the lower housing having at least one aperture for venting heat from the power source;
wherein at least a portion of the lower housing and the power source are located below the bottom edges of the front and the back;
a support pole coupled to the mobile checklane structure and extending from a top surface of a countertop along an axis and terminating at a top end;
a mobile computing device mounted to the support pole and having a display screen;
a printer mounted to the support pole and in data communication with the mobile computing device;

wherein the power source is electrically coupled to and powers the mobile computing device and the printer through at least one conductor that runs inside the support pole; and wherein the mobile computing device and the printer together swing in concurrence about the axis of the support pole to orient the display screen of the mobile computing device and a front of the printer at various positions about the axis of the support pole for user access.

9. The mobile point-of-sale system of claim 8, further comprising an electrical cord having an electrical plug located on a retractable reel for charging the battery.

10. The mobile point-of-sale system of claim 8, further comprising an optical bar code scanner electrically coupled to the battery and in data communication with the mobile computing device, wherein the optical bar code scanner is located on the countertop of the mobile checklane structure.

11. The mobile point-of-sale system of claim 8, further comprising an electronic payment processing module electrically coupled to the battery and in data communication with the mobile computing device, wherein the electronic payment processing module is located on the countertop of the mobile checklane structure.

12. The mobile point-of-sale system of claim 8, further including:
    at least one wheel having an axle;
    the bottom includes a pair of upper decks and the lower housing is located below the pair of upper decks and at least a portion of said lower housing is located below said axle of said at least one wheel; and
    at least one of said pair of upper decks is located above an uppermost portion of said at least one wheel.

13. The mobile point-of-sale system of claim 12, wherein the at least one aperture in the lower housing comprises a plurality of apertures arranged to provide cross ventilation of the power source supported in the lower housing.

14. The mobile point-of-sale system of claim 12, wherein the cart frame comprises a plurality of sides, wherein a first side of the plurality of sides is recessed from ends of the front and the back.

15. The mobile point-of-sale system of claim 14, further comprising a bag shelf coupled to the first side of the cart frame and a bag rack coupled to the first side of the cart frame and being located above the bag shelf, wherein when the bag shelf and the bag rack are located in a collapsed state the bag shelf and the bag rack are recessed from the ends of the front and the back.

16. A method of configuring a mobile point-of-sale system comprising:

moving a mobile point-of-sale system to a desired location, the mobile point-of-sale system including a cart frame and a power source including a battery housed in the cart frame, the cart frame comprising a front having a bottom edge, a back having a bottom edge and a bottom including components for receiving wheels for supporting the cart frame and a lower housing for housing the battery, the lower housing having at least one aperture for venting heat from the battery wherein at least a portion of the lower housing and the battery are located below the bottom edges of the front and the back, the mobile point-of-sale system further including a countertop, a support pole extending from a top surface of the countertop along an axis;

powering-on a mobile computing device having a display screen and powering-on a printer that is in data communication with the mobile computing device, the mobile computing device and the printer are both mounted to different portions of the support pole and are coupled to and powered by the power source through at least one conductor that is located inside the support pole; and selectively adjusting a position of the mobile computing device and the printer depending on a side of the mobile point-of-sale system where user access is needed, wherein the mobile computing device and the printer swing together about the axis of the support pole.

17. The method of claim 16, further comprising unplugging the mobile point-of-sale system from a power outlet before moving the mobile point-of-sale system to the desired location, wherein unplugging the mobile point-of-sale system changes the power source from a charging state to a neutral state.

18. The method of claim 17, wherein powering-on the mobile computing device and powering-on the printer changes the power source from a neutral state to a discharging state.

19. The method of claim 16, further comprising lifting a bag shelf attached to an exterior of the cart frame from a collapsed state to an erected state.

20. The method of claim 16, further comprising lifting a shopping basket shelf attached to an exterior of the cart frame from a collapsed state to an erected state.

* * * * *